US006078844A

United States Patent [19]
Magee et al.

[11] Patent Number: 6,078,844
[45] Date of Patent: Jun. 20, 2000

[54] OPTIMAL ARBITRARY TIME-DELAY (OAT) FILTER AND METHOD TO MINIMIZE UNWANTED SYSTEM DYNAMICS

[75] Inventors: David Patrick Magee, Plano, Tex.; Wayne J. Book, Atlanta, Ga.

[73] Assignee: Georgia Tech Research Corp., Atlanta, Ga.

[21] Appl. No.: 08/832,099

[22] Filed: Apr. 3, 1997

[51] Int. Cl.[7] .................................................. G05B 13/02
[52] U.S. Cl. ............................................... 700/55; 700/54
[58] Field of Search ................................. 700/43, 54, 55; 702/190; 708/300, 315; 333/167, 173

[56] References Cited

U.S. PATENT DOCUMENTS

| | | | |
|---|---|---|---|
| 2,801,351 | 7/1957 | Calvert et al. | 307/149 |
| 3,010,035 | 11/1961 | Calvert et al. | 307/152 |
| 4,864,206 | 9/1989 | Onaga et al. | 318/568.1 |
| 4,916,635 | 4/1990 | Singer et al. | 364/513 |
| 4,991,107 | 2/1991 | Sloane | 364/508 |
| 5,248,922 | 9/1993 | Meshkat | 318/560 |
| 5,371,451 | 12/1994 | Toyosawa et al. | 318/568.1 |
| 5,638,267 | 6/1997 | Singhose et al. | 364/148 |

OTHER PUBLICATIONS

Cannon, D.W., Magee, D.P., and Book, W.J., "Experimental Study on Micro/Macro Manipulator Vibration Control," Proceedings of the IEEE Conference, Atlanta, GA, Apr. 25, 1996.

Feddema, J.T., "Digital Filter Control of Remotely Operated Flexible Robotic Sructures," *Proceedings of the ANS Fifth Topical Meeting on Robotics and Remote Systems*, vol. 1, Knoxville, TN, Apr. 25–30, 1993, pp. 259–264.

Gorbatenko, G.G., "Posicast Control by Delayed Gain," *Control Engineering*, vol. 12, No. 2, Feb. 1965, pp. 74–77.

Hillsley, K.L. and Yurkovich, S., "Vibration Control of a Two–Link Flexible Robot Arm," *Proceedings of the IEEE International Conference on Robotics and Automation*, vol. 3, Sacramento, CA, Apr. 9–11, 1991, pp. 2121–2126.

Huang, S.J. and Lian, R.J., "Active Optimal Vibration Control for a Lumped System," *Computers & Structures*, vol. 51, No. 6, Jun. 17, 1994, pp. 749–762.

Hyde, J.M. and Seering, W.P., "Using Input Command Pre–Shaping to Suppress Multiple Mode Vibration," *Proceedings of the IEEE International Conference on Robotics and Automation*, vol. 3, Sacramento, CA, Apr. 9–11, 1991, pp. 2604–2609.

Hyde, J.M. and Seering, W.P., "Inhibiting Multiple Mode Vibration in Controlled Flexible Systems," *Proceedings of the American Control Conference*, vol. 3, Boston, MA, Jun. 26–28, 1991, pp. 2449–2454.

Johnson, C.R., Jr., "On the Interaction of Adaptive Filtering, Identification, and Control," *IEEE Signal Processing Magazine*, vol. 12, No. 2, Mar. 1995, pp. 22–37.

Khorrami, F., Jain, S., and Tzes, A., "Experiments on Rigid Body Based Controllers with Input Preshaping for a Two–Link Flexible Manipulator," *Proceedings of the American Control Conference*, vol. 4, Chicago, IL, Jun. 24–26, 1992, pp. 2957–2961.

(List continued on next page.)

*Primary Examiner*—Paul P. Gordon
*Attorney, Agent, or Firm*—Thomas, Kayden, Horstemeyer & Risley, L.L.P.

[57] ABSTRACT

Disclosed is an optimal arbitrary time-delay (OAT) filter to shape input signals by which a controlled motion is actuated in a physical system. The filter minimizes unwanted dynamics from being created by the actuation of the controlled movement in the physical system. The filter generally comprises three coefficients which are multiplied by the discrete samples of the input signal in a digital filter performing a convolution function. The samples multiplied by the three coefficients are separated by an arbitrary time delay. In this manner, three separate signals are generated. The results of these multiplication operations are summed in real time, thereby generating a filtered input signal which is sent to actuate the controlled motion of the physical system with minimal unwanted dynamics.

16 Claims, 10 Drawing Sheets

OTHER PUBLICATIONS

Khorrami, F., Jain, S., and Tzes, A., "Experimental Results on Adaptive Nonlinear Control and Input Preshaping for Multi–Link Flexible Manipulators," *Automatica*, vol. 31, No. 1, Jan. 1995, pp. 83–97.

Magee, D.P. and Book, W.J., "The Application of Input Shaping to a System with Varying Parameters," *Proceedings of the Japan/USA Symposium on Flexible Automation*, vol. 1, San Francisco, CA, Jul. 13–15, 1992, pp. 519–526.

Magee, D.P. and Book, W.J., "Eliminating Multiple Modes of Vibration in a Flexible Manipulator," *Proceedings of the IEEE International Conference on Robotics and Automation*, vol. 2, Atlanta, GA, May 2–6, 1993, pp. 474–479.

Magee, D.P. and Book, W.J., "Implementing Modified Command Filtering to Eliminate Multiple Modes of Vibration," *Proceedings of the American Control Conference*, vol. 3, San Francisco, CA, Jun. 2–4, 1993, pp. 2700–2704.

Magee, D.P. and Book, W.J., "Filtering Schilling Manipulator Commands to Prevent Flexible Structure Vibration," *Proceedings of the American Control Conference*, vol. 3, Baltimore, MA, Jun. 29–Jul. 1, 1994, pp. 2538–2542.

Magee, D.P. and Book, W.J., "Filtering Micro–Manipulator Wrist Commands to Prevent Flexible Base Motion," *Proceedings of the American Control Conference*, vol. 1, Seattle, WA, Jun. 21–23, 1995, pp,. 924–928.

Magee, D.P., Cannon, D.W. and Book, W.J., "Combined Command Shaping and Inertial Damping for Flexure Control," *Proceedings of the American Control Conference*, vol. 3, Albuquerque, NM, Jun. 4–6, 1997, pp. 1330–1334.

Masri, S.F., Bekey, G.A., and Caughey, T.K., "Optimum Pulse Control of Flexible Structures," *ASME Journal of Applied Mechanics*, vol. 48, No. 3, Sep. 1981, pp. 619–626.

Murphy, B.R. and Watanabe,I., "Digital Shaping Filters for Reducing Machine Vibration," *IEEE Transactions on Robotics and Automation*, vol. 8, No. 2, Apr. 1992, pp. 285–289.

Rappole, B.W., Jr., Singer, N.C., and Seering, W.P., "Input Shaping with Negative Sequences for Reducing Vibrations in Flexible Structures," *Proceedings of the American Control Conference*, vol. 3, San Francisco, CA, Jun. 2–4, 1993, pp. 2695–2699.

Rattan, K.S. and Feliu, V., "Feedforward Control of Flexible Manipulators," *Proceedings of the IEEE National Aerospace and Electronics Conference*, vol. 3, Dayton, OH, May 20–24, 1991, pp. 1084–1089.

Rattan, K.S. and Feliu, V., "Feedforward Control of Flexible Manipulators," *Proceedings of the IEEE International Conference on Robotics and Automation*, vol. 1, Nice, France, May 12–14, 1992, pp. 788–793.

Sayed, A.H. and Kailath, T., "A State–Space Approach to Adaptive RLS Filtering," *IEEE Signal Processing Magazine*, vol. 11, No. 3, Jul. 1994, pp. 18–60.

Singer, N.C. and Seering, W.P., *Preshaping Command Inputs to Reduce System Vibration*, Artificial Intelligence Memo No. 1027, Massachusets Institute of Technology, Jan. 1988.

Singer, N.C. and Seering, W.P., "Preshaping Command Inputs to Reduce System Vibration," *ASME Journal of Dynamic Systems, Measurement, and Control*, vol. 112, No. 1, Mar. 1990, pp. 76–82.

Singer, N.C. and Seering, W.P., "An Extension of Command Shaping Methods for Controlling Residual Vibration using Frequency Sampling," *Proceedings of the IEEE International Conference on Robotics and Automation*, vol. 1, Nice, France, May 12–14, 1992, pp. 800–805.

Singhose, W.E., Seering, W.P. and Singer, N.C., "Shaping Inputs to Reduce Vibration: A Vector Diagram Approach," *Proceedings of the IEEE International Conference on Robotics and Automation*, vol. 2, Cincinnati, OH, May 13–18, 1990, pp. 922–927.

Singhose, W.E., Singer, N.E., and Seering, W.P., "Design and Implementation of Time–Optimal Negative Input Shapers," *Dynamic Systems and Control*, DSC–vol. 55–1, 1994 ASME Winter Annual Meeting, Chicago, IL, Nov. 6–11, 1994, pp. 151–157.

Singhose, W.E., Porter, L.J., and Singer, N.C., "Vibration Reduction Using Multi–Hump Extra–Insensitive Input Shapers," *Proceedings of the American Control Conference*, vol. 5, Seattle, WA, Jun. 21–23, 1995, pp. 3830–3834.

Singhose, W.E., Seering, W.P. and Singer, N.C., "Time–Optimal Negative Input Shapers," *ASME Journal of Dynamic Systems, Measurement, and Control*, vol. 119, No. 2, Jun. 1997, pp. 198–205.

Tallman, G.H. and Smith, O.J.M., "Analog Study of Dead–Beat Posicast Control," *IRE Transactions on Automatic Control*, vol. PGAC, No. 4, Mar. 1958, pp. 14–21.

Tuttle, T.D. and Seering, W.P., "Deriving and Verifying Time–Optimal Commands for Linear Systems," *Proceedings of the American Control Conference*, vol. 3, Albuquerque, NM, Jun. 4–6, 1997, pp. 1325–1329.

Tzes, A. and Yurkovich, S., "An Adaptive Input Shaping Control Scheme for Vibration Suppression in Slewing Flexible Structures," *IEEE Transactions on Control Systems Technology*, vol. 1, No. 2, Jun. 1993, pp. 114–121.

Yurkovich, S., Tzes, A.P., and Hillsley, K.L., "Controlling Coupled Flexible Links Rotating in the Horizontal Plane," *Proceedings of the American Control Conference*, vol. 1, San Diego, CA, May 23–25, 1990, pp. 363–367.

Magee, D.P., "Dynamic Control Modification Techniques in Teleoperation of a Flexible Manipulator," M.S. Thesis, Georgia Institute of Technology, Nov. 1991.

Magee, et al., "Experimental Verification of Modified Command Shaping using a Flexible Manipulator," Proceedings of the First International Conference on Motion and Vibration Control, vol. 1, Yokohama, Japan, Sep. 7–11, 1992, pp. 553–558.

Magee, D.P., "Optimal Arbitrary Time Delay Filtering to Minimize Vibration in Elastic Manipulator Systems," Ph.D. Thesis, Georgia Institute of Technology, Aug. 1996.

Singer, N.C., "Residual Vibration Reduction in Computer Controlled Machines," PH.D. Thesis, Massachusetts Institute of Technology, Feb. 1989.

Singh, et al., "Shaped Inputs for a Multimode System," Proceedings of the IEEE International Conference on Robotics and Automation, vol. 3, Atlanta, Georgia, May 2–6, 1993, pp. 484–489.

Singh, et al., "Robust Time–Delay Control," ASME Journal of Dynamic Systems, Measurement, and Control, vol. 115, No. 2A, Jun. 1993, pp. 303–306.

Singh, et al., "Robust Time Delay Control of Multimode Systems," Proceedings of the American Control Conference, vol. 1, Baltimore, MD., Jun. 29–Jul. 1, 1994, pp. 681–685.

Smith, O.J.M., "Feedback Control Systems," McGraw–Hill Book Company, Inc., New York, 1958, pp. 331–347.

Tuttle, et al., "A Zero Placement Technique for Designing Shaped Inputs to Suppress Multi–mode Vibration," Proceedings of the American Control Conference, vol. 3, Baltimore, MD, Jun. 29–Jul. 1, 1994, pp. 2533–2537.

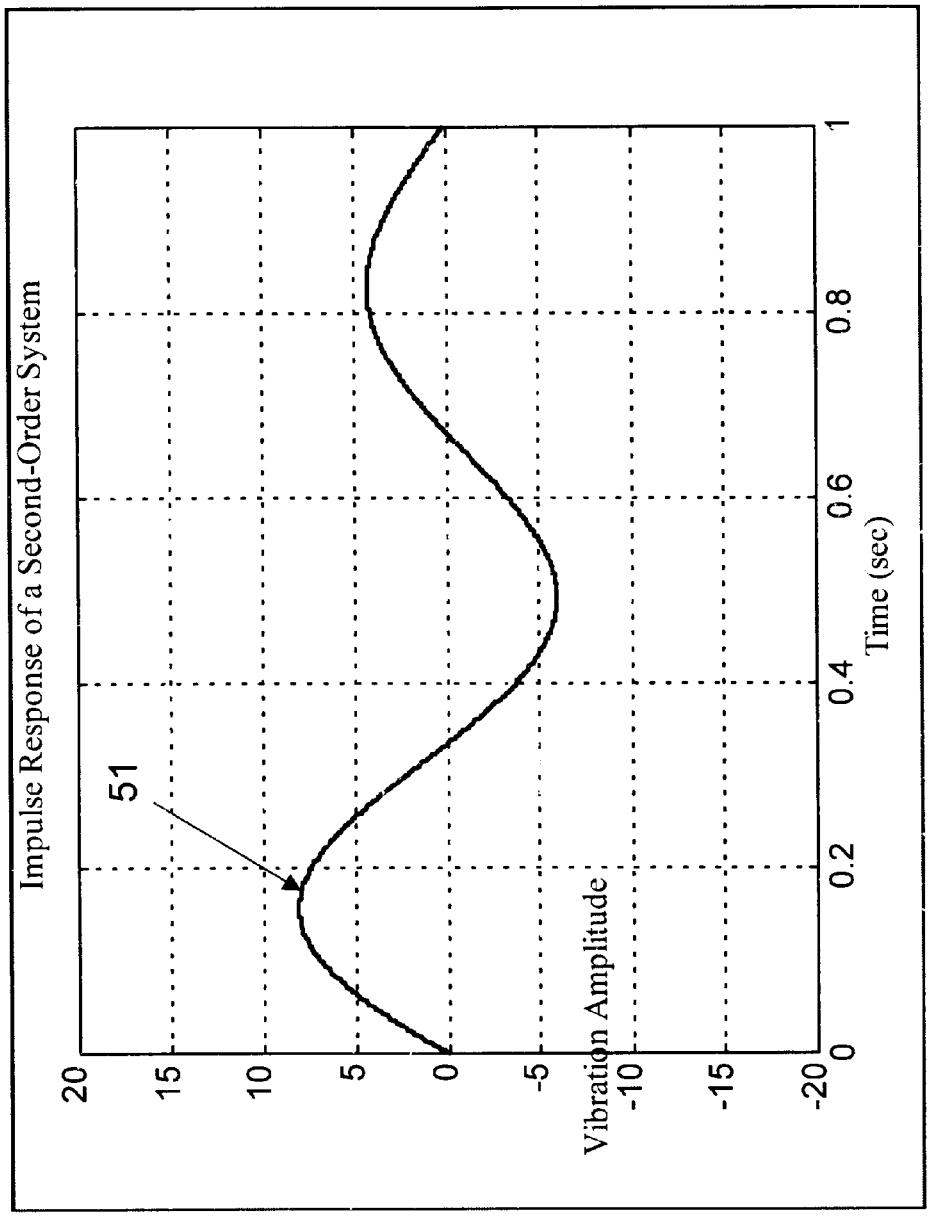

OPTIMAL ARBITRARY TIME-DELAY (OAT) FILTER AND METHOD TO MINIMIZE UNWANTED SYSTEM DYNAMICS

The subject matter of this document claims priority to co-pending and commonly assigned U.S. provisional patent application entitled, "Optimal Filtering of Inputs to Minimize Unwanted System Dynamics," filed May 15, 1996 and accorded Ser. No. 60/017745. The foregoing document is incorporated herein by reference.

FIELD OF THE INVENTION

The present invention generally relates to the field of control of mechanical systems and, more particularly, to control systems employing digital filters to minimize unwanted dynamics in a physical system with controlled motion.

BACKGROUND OF THE INVENTION

Manufacturing processes which involve the manipulation of mechanical systems are being performed with ever increasing speed. This trend is due in large part to the advent of high speed electronic control systems. Many of these mechanical systems require precision control of position or other aspects of the operation. For example, an actuator in a robotic device may create a controlled movement or other action whereby a task is accomplished. Oftentimes there may be several tasks that are completed in rapid succession.

In performing such tasks, it is often the case that the controlled motion will be imperfect in so far that it does not match the motion that was desired due to physical realities extant in each situation. For example, a robot arm might move from one position to a target position, but will not come to rest immediately at the target position. A vibration may occur as the arm flexes when attempting to stop and overshoots the target position, oscillating until it finally comes to rest. In such a situation, the actuator will in reality create imperfection in the motion.

This unwanted motion or unwanted dynamics may hinder high speed production or create problems in the operation of machines. For example, unwanted dynamics created by actuators on a system in response to a control command will cause a loss in manufacturing time as the system may be required to wait until unwanted vibration or other dynamics settle. This is commonly referred to as "settling time." In the case of manufacturing processes, unwanted movement may cause inaccuracies that translate into quality control problems. Also, inaccuracies in controlled movements may result in unnecessary wear and tear on equipment.

Consequently, there is a need for control systems that will actuate controlled motions in a manner in which unwanted dynamics are minimized or eliminated.

SUMMARY OF THE INVENTION

In response to the need as outlined above, there is disclosed a method and apparatus for filtering a control signal to minimize unwanted dynamics. The filter itself is labeled an optimal arbitrary time-delay (OAT) filter after its essential characteristics.

In the preferred embodiment, unwanted dynamics in a physical system are minimized by filtering the system input. The filter which is executed on a computer control system creates a filtered input that is equal to the summation of calculated signals which are a function of the system input and filter coefficients. The three or more calculated signals are separated by an arbitrary time-delay that is greater than zero. Each filter will minimize a single mode of vibration in the dynamic system. Consequently, for a system with multiple modes of vibration which must be addressed, multiple filters are used, each filter designed to minimize a single mode of vibration.

The coefficients employed are derived from the optimization of a cost function that defines the unwanted dynamics of the physical system response as a function of an instantaneous position error and an instantaneous velocity error.

The present invention is easily applied to single and multiple modes of unwanted dynamics or vibration. A single filter will address a single mode. In the case of multiple modes, single mode filters are cascaded together in series where the system input will be processed by each single mode filter suceesively, ultimately generating an output. The number of single mode filters employed in this manner equals the number of modes of unwanted movement to be minimized.

The present invention can also be conceptualized as providing a method for generating an input to a physical system to minimize unwanted dynamics in the physical system response. In this regard, the method can be broadly summarized as follows: establishing a first expression quantifying the unwanted dynamics in terms of an instantaneous position and velocity error, minimizing the expression to produce a filter expression by which a filtered input is generated which is a function of filter coefficients and an arbitrary time-delay greater than zero, and controlling a physical system based on the filtered input.

The advantages of the present invention include an arbitrary time delay which allows the user to cater the response of the filter to the given application and makes the overall filter much easier to implement. Also, the invention is very easy to implement on existing computer control systems without the addition of hardware.

Other advantages include the decrease in unwanted dynamics in the physical system controlled. Specifically, long term wear and tear experienced due to long term vibration or unwanted movement is reduced. Also, processes requiring precision placement of parts can be made more accurate and efficient due to the reduced settling time for physical components.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

FIG. 2 is a graphical depiction of an unfiltered impulse response of a second order physical system;

DETAILED DESCRIPTION OF THE PREFERRED EMBODIMENT

Figure 1A:
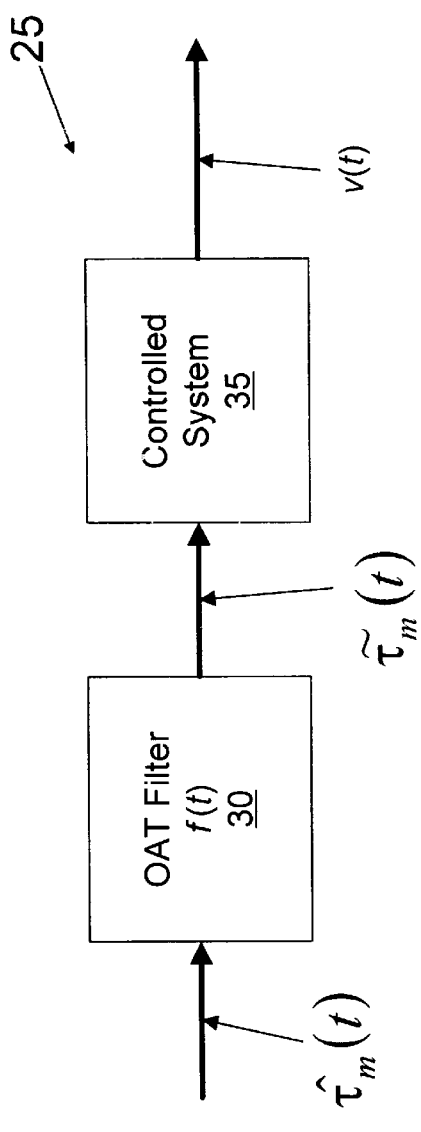
FIG. 1A is a theoretical block diagram of an optimal arbitrary time-delay (OAT) filter of the invention.

For the purposes of theoretical development in the discussion that follows, FIG. 1A shows a first block diagram 25 of the optimal arbitrary time-delay (OAT) filter 30. The input signal $\hat{\tau}_m(t)$ is processed by filter 30 with impulse response f(t) producing filtered input $\tau_m(t)$ which is sent to the controlled system 35 where t is defined as continuous time. The vibration v(t), results from actuation in response to the filtered input $\tau_m(t)$. The input vector $\hat{\tau}_m(t)$ is made up of any number of distinct inputs $\hat{\tau}_{m_i}(t)$, the $i^{th}$ physical input to the controlled system 35 such as a hydraulic actuator or other type of actuation. Likewise, the filtered input vector $\tau_m(t)$ is a signal which is made up of any number of distinct filtered inputs $\tau_{m_i}(t)$.

In order to derive an expression to define the filter 30 with impulse response f(t), a mathematical relationship is developed between the original input $\hat{\tau}_m(t)$ and the vibration v(t). To accomplish this, the first step is to determine the mathematical relationship between the input $\hat{\tau}_m(t)$ and the filtered input $\tau_m(t)$. The function for the $i^{th}$ input to the system in terms of the response of the filter to an impulse input $\delta(t)$ is specified as $$f_i(t) = \sum_{j=0}^{P_i} f_{ij} \delta(t - jT_i) \text{ with } f_{i0} = 1, 1 \leq i \leq n \quad (1.0)$$

where $f_{ij}$ is the $j^{th}$ coefficient for the $i^{th}$ input filter, $\delta(t)$ is a Dirac delta function, $T_i$ is an arbitrary time-delay value for the $i^{th}$ input filter, and $p_i+1$ is the number of filter coefficients for the $i^{th}$ input filter and n is the number of inputs. The $T_i$ time-delays can be chosen as integer multiples of the digital sampling period of a discrete computer, for applications in which this filter is implemented in a digital computing environment such as a digital filter, the creation of which is known to those skilled in the art.

The mathematical relationship between the distinct inputs $\hat{\tau}_{m_i}(t)$ and the distinct filtered inputs $\tau_{m_i}(t)$ is created through the convolution of each distinct input $\hat{\tau}_{m_i}(i)$ with its own filter $f_i(t)$. Thus the distinct filtered inputs $\tau_{m_i}(t)$ are expressed as $$\tau_{m_i}(t) = \sum_{j=0}^{P_i} f_{ij} \hat{\tau}_{m_i}(t - jT_i) \quad (2.0)$$

which can be interpreted as a sum of time-delayed inputs scaled by each filter coefficient.

Next, the elastic response of the controlled system $\hat{x}_e(t)$ is determined. This response is expressed in the general equation $$\hat{x}_e(t) = \phi(t, t_0)\hat{x}_e(t_0) + \int_{t_0}^{t} \phi(t, \varepsilon)\overline{B}_e \hat{\tau}_m(\varepsilon) d\varepsilon \quad (3.0)$$

where $\phi(t,t_0)$ is the state transition matrix of the elastic system. The vector $\hat{x}_e(t)$ can be written in terms of v(t) where $$\hat{x}_e(t) = \begin{bmatrix} v(t) \\ \dot{v}(t) \end{bmatrix}$$

and $\overline{B}_e$ is defined as the weighting matrix of the input $\hat{\tau}_m(\varepsilon)$ on the rate of change of the response $\hat{x}_e(t)$, where $\varepsilon$ is defined as the integration variable with units of time.

To gain the desired elastic response from the filtered input $\tau_m(t)$, equation (2.0) is substituted in as the input in equation (3.0). The filtered elastic state response becomes $$\hat{x}_e(t) = \phi(t, t_0)\hat{x}_e(t_0) + \int_{t_0}^{t} \phi(t, \varepsilon)\overline{B}_e \begin{bmatrix} \sum_{j=0}^{P_1} f_{1j}\hat{\tau}_{m_1}(\varepsilon - jT_1) \\ \vdots \\ \sum_{j=0}^{P_n} f_{nj}\hat{\tau}_{m_n}(\varepsilon - jT_n) \end{bmatrix} d\varepsilon. \quad (4.0)$$

in which the filtered elastic state response of the system $\hat{x}_e(t)$ is expressed in terms of the unknown filter coefficients $f_{ij}$.

Optimization of Unknown Coefficients

Now that a general equation that represents the filtered elastic state response $\hat{x}_e(t)$ of the system to an input $\hat{\tau}_m(t)$ has been ascertained, the filter design process is specified.

In the filter development process, a cost function must be specified. A cost function is defined in this design process as an expression which describes the penalty realized due to the error in an elastic response to an input. The filter is designed through the optimization of the cost function by minimizing it with respect to the filter coefficients.

Several different cost function candidates are the mean square value of the error in the system states, the absolute value of the error in the system states, and the integral of the mean square value of the error in the system states which are expressions generally understood by those skilled in the art.

Figure 1B:
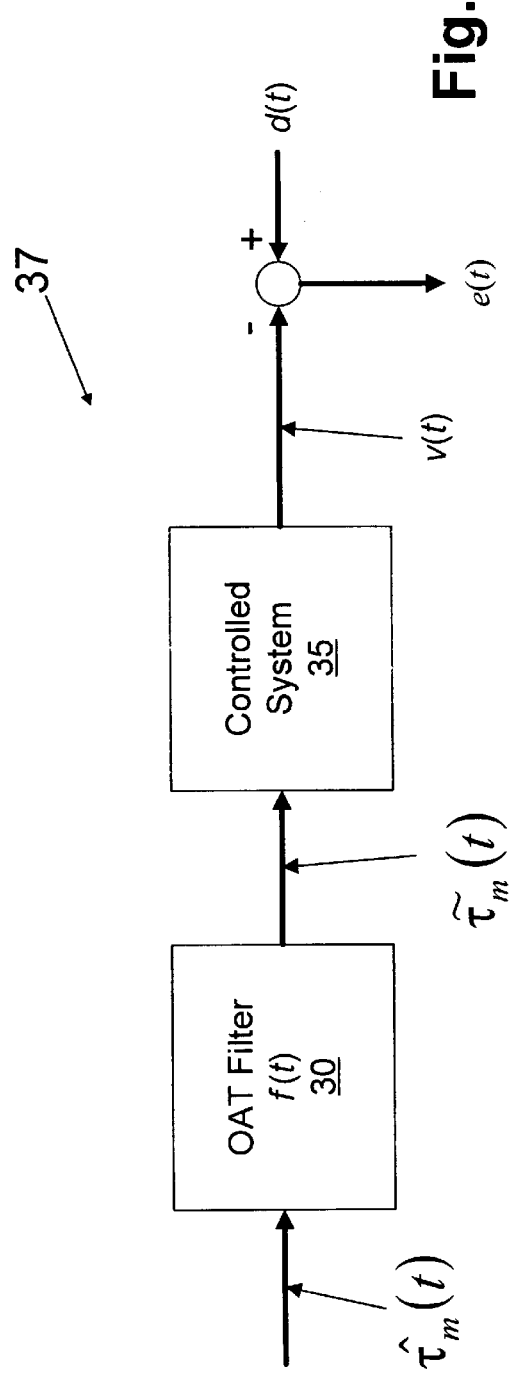
FIG. 1B is a block diagram of the OAT filter of FIG. 1A with added features to derive a cost function.

For purposes of discussion relating to the development of the cost function of the preferred embodiment, FIG. 1B, shows a second block diagram 37 of the input signal $\hat{\tau}_m(t)$, filter f(t) 30, filtered input $\tau_m(t)$, controlled system 35, and the vibration v(t) as shown in FIG. 1A. Also shown is the desired vibration d(t), which is equated to zero, from which the actual vibration v(t) is subtracted resulting in the vibration error e(t), which can also be thought of as the position error in terms of time t. Thus the velocity error in terms of time is the derivative of e(t) with respect to time and is denoted $\dot{e}(t)$.

In the preferred embodiment, the cost function denoted J(t), is specified to be an expression using both the error signal e(t) and the time rate of change in the error signal $\dot{e}(t)$ and is specified as $$J(t) = \tfrac{1}{2} e^T(t) W_1 e(t) + \tfrac{1}{2} \dot{e}^T(t) W_2 \dot{e}(t) \tag{5.0}$$

where $W_1$ and $W_2$ are positive definite, symmetric weighting matrices for the errors in position and velocity, respectively.

By writing the desired movement d(t) in the vector form $$\hat{x}_{e_d}(t) = \begin{bmatrix} d_e(t) \\ \dot{d}_e(t) \end{bmatrix}, \tag{6.0}$$

the cost function can be written in terms of the state vectors as $$J(t) = \tfrac{1}{2} (\hat{x}_{e_d}(t) - \hat{x}_e(t))^T W (\hat{x}_{e_d}(t) - \hat{x}_e(t)) \tag{7.0}$$

where the general weighting matrix W is of the form $$W = \begin{bmatrix} W_1 & 0_{m \times m} \\ 0_{m \times m} & W_2 \end{bmatrix} \tag{8.0}$$

with the appropriate units.

Substituting equation 4.0 for $x_e(t)$ in equation 7.0, the cost function can be written as $$J(t) = \frac{1}{2} \tag{9.0}$$

$$\left( \hat{x}_{e_d}(t) - \phi(t, t_0) \hat{x}_e(t_0) - \int_{t_0}^{t} \phi(t, \varepsilon) \overline{B}_e \begin{bmatrix} \sum_{j=0}^{P_1} f_{1j} \hat{\tau}_{m_1}(\varepsilon - jT_1) \\ \vdots \\ \sum_{j=0}^{P_n} f_{nj} \hat{\tau}_{m_n}(\varepsilon - jT_n) \end{bmatrix} d\varepsilon \right)^T$$

$$W \left( \hat{x}_{e_d}(t) - \phi(t, t_0) \hat{x}_e(t_0) - \int_{t_0}^{t} \phi(t, \varepsilon) \overline{B}_e \begin{bmatrix} \sum_{j=0}^{P_1} f_{1j} \hat{\tau}_{m_1}(\varepsilon - jT_1) \\ \vdots \\ \sum_{j=0}^{P_n} f_{nj} \hat{\tau}_{m_n}(\varepsilon - jT_n) \end{bmatrix} d\varepsilon \right)$$

which is an explicit function of the unknown filter coefficients $f_{ij}$. Since the number of filter coefficients and the time-delay values are not necessarily the same for each filter, the cost function can only be minimized after the last input is given (i.e. $t > P_k \cdot T_k$).

The minimization of the cost function above reveals a closed form solution for the optimal filter coefficients. This solution is not limited by the number of resonances in the system and it minimizes the vibration level defined by the specified cost function. The solution is also optimal regardless of the time-delay values $T_j$, which are greater than zero, that were defined in the general filter form 1.0. The time-delay values $T_j$ are then adjusted to cater the response of the controlled system and to achieve an exact representation of the filtering algorithm in a discrete-time control system.

To demonstrate a practical application of the preferred embodiment, consider a single mode of vibration that can be modeled by the second-order differential equation:

$$m\ddot{v}(t) + b\dot{v}(t) + kv(t) = ku(t) \tag{10.0}$$

where u(t) is a displacement input. This equation can be rewritten in terms of the natural frequency, $\omega_n$, and the damping ratio, $\zeta$, of the vibration as $$\ddot{v}(t) + 2\zeta \omega_n \dot{v}(t) + \omega_n^2 v(t) = \omega_n^2 u(t) \tag{11.0}$$

where $$\omega_n = \sqrt{\frac{k}{m}} \quad \text{and} \quad \zeta = \frac{b}{2\sqrt{k \cdot m}}.$$

It is noted that the Laplace transform of this differential equation can be written as a transfer function, H(s), in the form $$H(s) \equiv \frac{V(s)}{U(s)} = \frac{\omega_n^2}{s^2 + 2\zeta \omega_n s + \omega_n^2} \tag{12.0}$$

where s is a complex variable. The poles of the transfer function (roots of the denominator) describe the characteristic behavior of the vibration and are located at $$s = -\zeta \omega_n \pm j \omega_n \sqrt{1 - \zeta^2} \tag{13.0}$$

for lightly damped vibrations.

Now, an optimal filter is designed for a single mode of vibration using the outlined procedure. The general form of the optimal filter is defined by the impulse response $$f_{opt}(t) = \tag{14.0}$$

$$\frac{1}{M} \delta(t) - \frac{2\cos(\omega_n \sqrt{1 - \zeta^2}\, T) e^{-\zeta \omega_n T}}{M} \delta(t - T) + \frac{e^{-2\zeta \omega_n T}}{M} \delta(t - 2T)$$

where $M = 1 - 2\cos(\omega_n \sqrt{1-\zeta^2}\,T) e^{-\zeta \omega_n T} + e^{-2\zeta \omega_n T}$. Note that M is introduced as a scaling factor calculated to yield the same net motion from the filtered input $\tau_m$ as would have been achieved with the unfiltered input $\hat{\tau}_m$. There are other values of M as known to those skilled in the art. Note then, that the transfer function, $F_{opt}(s)$, of the filter becomes $$F_{opt}(s) = \frac{1 - 2\cos(\omega_n \sqrt{1-\zeta^2}\,T) e^{-\zeta \omega_n T} e^{-sT} + e^{-2\zeta \omega_n T} e^{-s2T}}{1 - 2\cos(\omega_n \sqrt{1-\zeta^2}\,T) e^{-\zeta \omega_n T} + e^{-2\zeta \omega_n T}} \tag{15.0}$$

Although this equation appears rather involved, the characteristics of the filter can be determined from the zeros of the transfer function. They are located at $$s = -\zeta \omega_n \pm j \left( \omega_n \sqrt{1-\zeta^2} + \frac{2n\pi}{T} \right) \text{ for } n = 0, \pm 1, \pm 2, \ldots, \pm \infty \tag{16.0}$$

The first observation to be made is that the filtering algorithm places zeros at the pole locations of the oscillatory system. This pole-zero overlap will cancel any vibration produced by the resonant poles of the system. The second observation is that the filtering algorithm performs the pole-zero cancellation regardless of the time-delay value T.

Thus for a single mode vibration, the filter coefficients $C_1$, $C_2$ and $C_3$ are $1/M$, $$\frac{-2\cos(\omega_n \sqrt{1-\zeta^2}\,T) e^{-\zeta \omega_n T}}{M},$$

and $$\frac{e^{-2\zeta\omega_n T}}{M},$$

respectively, where M is a scaling factor is equal to 1–2 cos $(\omega_n\sqrt{1-\zeta^2}T)e^{-\zeta\omega_n T}+e^{-2\zeta\omega_n T}$. It has been discovered that more coefficients will produce no more improvement of the cost function J(t), which has theoretically reached the lowest possible value for a second order system.

These coefficients may be implemented in a digital environment in a digital filter. Such a digital filter would perform the filter function represented by equation 14.0 as will be described in the first embodiment.

Figure 3:
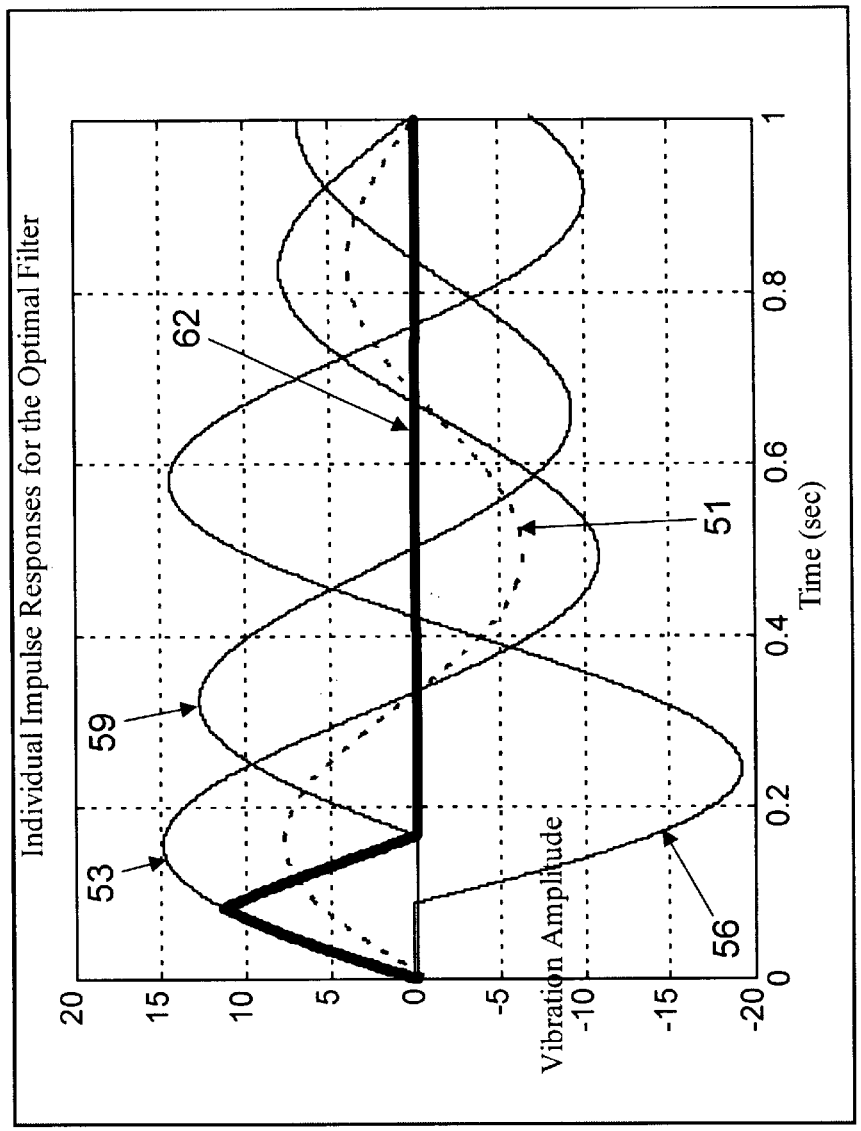
FIG. 3 is a graphical depiction showing both an unfiltered response and a filtered response of a second order physical system.

The elimination of a single mode vibration is shown graphically in FIGS. 2 and 3. Consider the impulse response for a single mode of vibration with parameters $\zeta=0.1$ and $\omega_n=3\pi$rad/s. Since an impulse is the input, the system impulse response 51 will be as shown in FIG. 2. However, if a filtered impulse input is given instead, the response can be interpreted as a summation of time-delayed impulse responses that are scaled by the filter coefficients. FIG. 3 shows a plot of both the unfiltered system response 51 as well as each of the individual time-delayed impulse responses 53, 56 and 59 and the summation or net response 62. Note that the vibration net response 62 is zero after a period of 2T seconds as this is when the last filter term is applied.

Multiple Mode Vibrations

Figure 4:
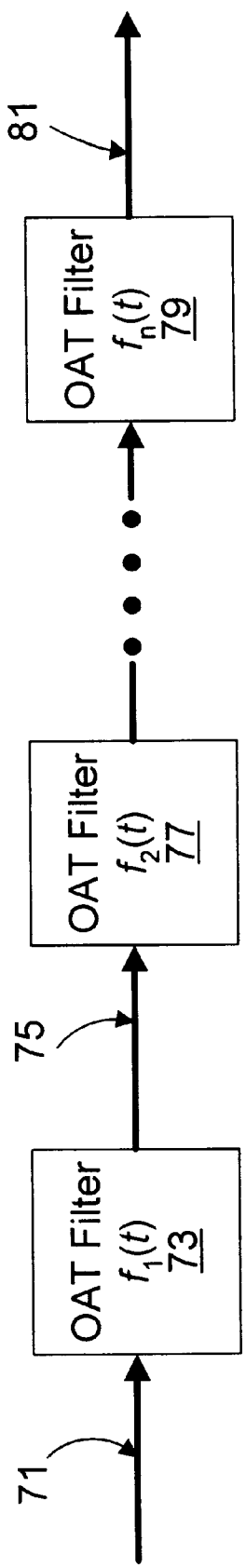
FIG. 4 is a block diagram of cascaded OAT filters of FIG. 1A to address multiple modes of vibration.

Turning to FIG. 4, shown is a third block diagram of multiple OAT filters 30 (FIG. 1A) It has been discovered that the OAT filter 30 (FIG. 1A) of the present invention is easily adapted to address multiple modes of vibration. When an input creates more than a single mode of vibration in a dynamic system, the different modes can be minimized if the input is filtered for each mode. Specifically, if the filter coefficients are determined by the method outlined above using a set of dynamic equations of motion for two or more modes of vibration, then the resulting filter equation f(t) will be equal to the convolution of the individual filters for each mode of vibration, Thus, the OAT filter 30 (FIG. 1A) of the present invention is easily applied to complex systems with multiple modes of vibration. The unfiltered input 71 need only be fed into the first OAT filter $f_1(t)$ 73 which will eliminate the first mode of vibration. The first output 75 is then fed into second OAT filter $f_2(t)$ 77 to minimize the second mode of vibration and so on for each mode of vibration until the final OAT filter $f_n(t)$ 79, from which emerges the filtered input 81.

First Physical Embodiment of the Invention

Figure 5:
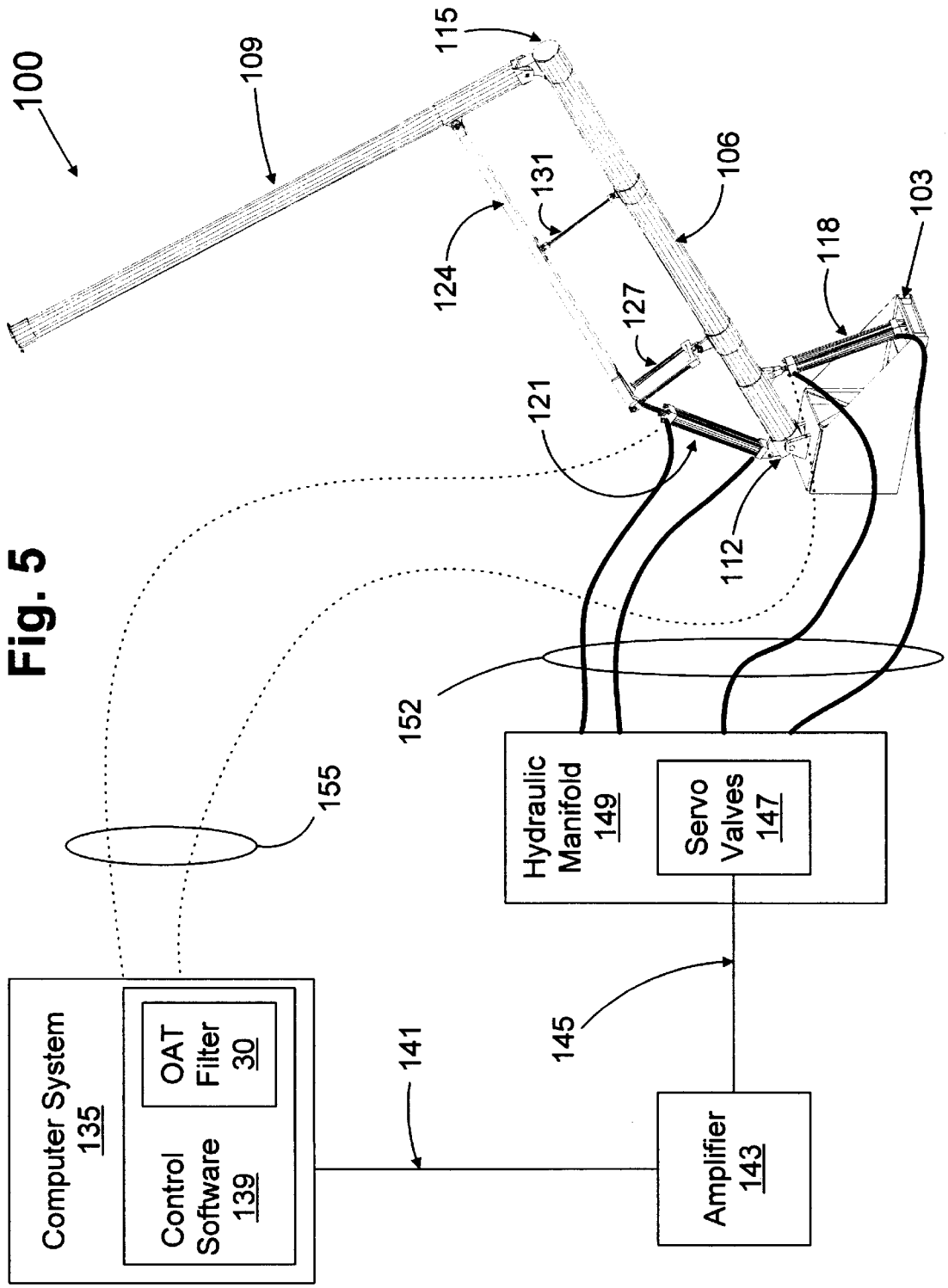
FIG. 5 is a schematic of a physical system and control system of the first embodiment of the invention.

Turning to FIG. 5, shown is a first physical embodiment of the invention. Illustrated is the mechanical arm system 100 with base 103, first member 106, and second member 109. The first member 106 is pivotally connected to the base 103 by the base hinge 112 and first member 106 is pivotally connected to second member 109 by elbow hinge 115. Mechanical arm system 100 features a first hydraulic actuator 118 and a second hydraulic actuator 121. The first hydraulic actuator 118 is pivotally connected to the base 103 and first member 106 and will cause first member to pivot in an upward or downward in an arc-like motion when the actuator 118 is extended or retracted.

The second hydraulic actuator is pivotally connected to the first member 106 and to one end of the actuator extension member 124. The remaining end of actuator extension member 124 is pivotally connected to the second member 109. The actuator extension member is also held by first extension guide 127 and the second extension member guide 131, One end of the first extension guide 127 is pivotally connected to the same end of the actuator extension member 124 at which the second actuator 121 is connected. One end of the second extension member guide 131 is pivotally connected to the middle of the actuator extension member 124, while the other end is pivotally connected to the first member 106 of the mechanical arm system 100. When the second hydraulic actuator 121 is extended or retracted, it will cause the second member 109 of the mechanical arm system 100 to move back and forth in an arc-like motion centered at the elbow hinge 115.

The mechanical arm system 100 is controlled by computer 135, on which control software 139 including the OAT filter 30 operates. In the first embodiment, computer 135 is a standard personal computer with a standard microprocessor known to those skilled in the art. The computer 135 can also be a digital signal processor (DSP) or other suitable logic device with the capability of performing the calculations necessary in the first embodiment.

Computer 135 is electrically connected to the amplifier 143 via the communications cable 141. The communications wire may be any type of electrical cable suitable to communicate the signal type chosen as known to one skilled in the art. In the first embodiment, the control signal generated by the software running on computer 135 is of the low power variety, but may be a voltage or current signal suitable for the intended purpose as known to those skilled in the art.

The control signal received from computer 135 is then amplified by amplifier 143 to the appropriate actuation signal level necessary to operate the hydraulic servo valves 147. The amplifier 143 is then electrically connected to the servo valves 147 via a power cable 145. The servo valves 147 are located on the hydraulic manifold 149. The specifications of the power cable of which will depend on the nature of the signal, which is an expedient known to those skilled in the art.

When actuated, the servo valves 147 mounted on the hydraulic manifold 149 will pressurize the fluid leading to the hydraulic hoses 152, thereby actuating the hydraulic cylinders 118 and 121 as known to those skilled in the art. Resident within the hydraulic cylinders 118 and 121 are linear differential transducers (not shown) which will generate a signal relating to the position of the hydraulic cylinders 118 and 121 which is used for position feedback by the control software 139 operating on the computer 135. The use of linear differential transducers as such is an expedient known to those skilled in the art. The feedback position signal is communicated to the computer 135 via the feedback communications cables 155. The precise specifications of the cables 155 is an expedient well known to those skilled in the art.

Figure 6:
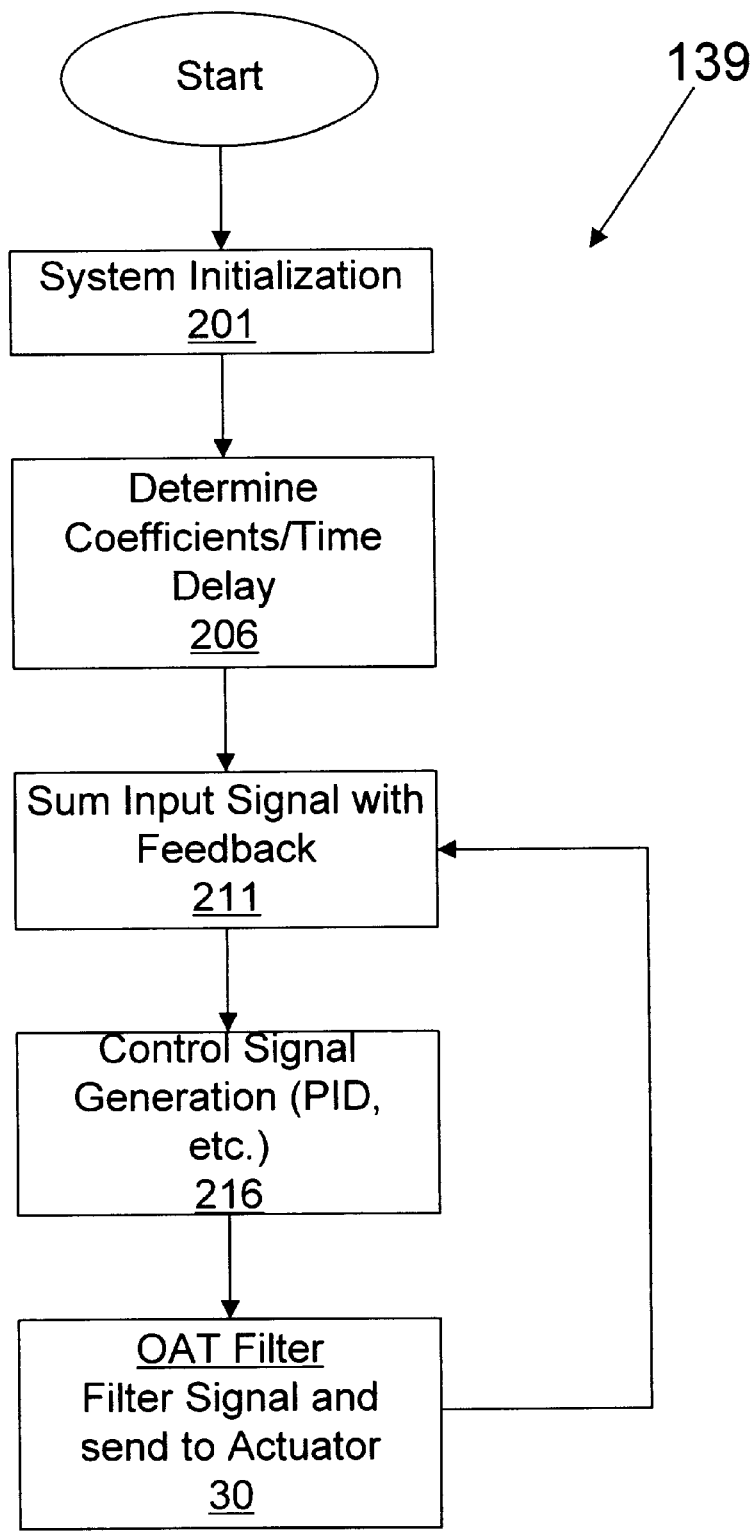
FIG. 6 is a flow diagram of the software that operates on the control system of FIG. 5.

Turning now to FIG. 6, shown is a flow diagram of the control software 139 employed in the first embodiment. In the initialization function 201, the initial position of both the first and second members 106 and 109 (FIG. 5) is set to equal their actual starting positions as determined from the linear differential transducers previously described. Also, a data array is initialized to hold signal data processed by the control software 139 Finally, in the first embodiment, a time variable that is manipulated by the control software 139 is initialized. The initialization of variables and arrays as shown here is an expedient well known to those skilled in the art.

In the second programming function 206, the filter coefficients and the arbitrary time-delay T are determined. The coefficients are calculated from the optimized filter derived previously. As was shown, the coefficients are a function of the natural frequency $\omega_n$ and the damping ratio, $\zeta$, of the physical system, which, in the case of the first embodiment is the mechanical arm system 100 (FIG. 5). These variables can be determined through physical experimentation by creating a test motion and sensing the unwanted dynamics, or they can be derived mathematically as known by those skilled in the art.

In the first embodiment, the natural frequency $\omega_n$ and the damping ratio, $\zeta$ are programmed into the system. It would also be possible to have several different "sets" of filter coefficients and arbitrary time-delays which the software would chose based on changes in the natural frequency $\omega_n$ and the damping ratio, $\zeta$ of the system during operation.

The arbitrary time-delay T is not determined by the manipulation of any particular mathematical formulation. It is a truly arbitrary variable limited only by the physical limitations of the physical system, or in the case of the first embodiment, the mechanical arm system 100 (FIG. 5). For instance, in the case of the first embodiment, the force demands on the hydraulic cylinders 118 and 121 (FIG. 5) will exceed the capabilities of those components if the arbitrary time-delay is too small. On the other hand, if the arbitrary time-delay is set too high, then the filtering function may be defeated as the mechanical arm system 100 (FIG. 5) or other physical system will experience unwanted movement in the time that it takes for the filter to operate.

Thus the specification of the arbitrary time-delay is up to one skilled in the art based on the system parameters and the desired motion to be achieved. A suggested time delay could be one quarter of a single period of the natural frequency $\omega_n$ of the physical system. Thus the only movement that will be experienced is one peak of the particular vibration at the time of one quarter of a single period of the natural frequency $\omega_n$ as is understood by those skilled in the art.

Once, the natural frequency $\omega_n$, the damping ratio, $\zeta$, and the arbitrary time-delay T are determined, the coefficients of the filter are calculated. Note that the physical characteristics of the mechanical arm system 100 (FIG. 5) or other physical system may change, thereby changing the natural frequency $\omega_n$ and the damping ratio, $\zeta$. In such a case, the coefficients will have to be recalculated based on the new parameters.

Note that the control software 139 may do this recalculation in real time provided that the computer system 135 has sensory capability with which to determine changes in the natural frequency $\omega_n$ and the damping ratio, $\zeta$. In some applications, however, the physical system may perform two or more repeated controlled motions, each motion being performed multiple times. In such a case, it would be possible to store a number of "sets" of coefficients corresponding to each motion with particular physical characteristics calculated with a specified time-delay constant T. Thus the coefficient determination function 206 may consist of choosing the particular preprogrammed "set" of coefficients to employ based on the preprogrammed movement to be performed.

In the first embodiment, the coefficients of the filter employed are calculated from the predetermined natural frequency $\omega_n$, the damping ratio, $\zeta$, and the arbitrary time-delay T and entered into the system memory for use in the filter calculation.

The summing function 211 is actually the beginning step of a standard control system. Thus, this function involves the generation of an error signal by subtracting the feedback signal from the desired motion input signal. This function is a matter of control theory that is well known to those skilled in the art. Note also that the desired input signal may be autonomous or non-autonomous depending on the particular application as known by those skilled in the art.

The control signal generation function 216 involves the implementation of a proportional-integral-derivative (PHD) controller or other suitable controller to generate a control signal based upon the error signal received from the summing function 211. Other control signal generators may include the use of a fuzzy logic controller, for example. Such control systems are well known to those skilled in the art and will not be discussed here in detail.

The OAT filter 30 is the implementation of a digital filter. The OAT filter 30 performs a convolution of the filter and the control signal employing the coefficients as determined in step 206. The logical flow of this particular function is further shown in FIGS. 7 and 8 and will be discussed in detail. In the first embodiment, the control system will then loop back to the summing function 211 to further actuate the desired motion. If the system parameters were subject to change, then an additional step would have to be added in which the system would sense such a change and then escape the aforementioned loop and revert to the coefficient/time-delay determination step 206 to recalculate the coefficients.

Figure 7:
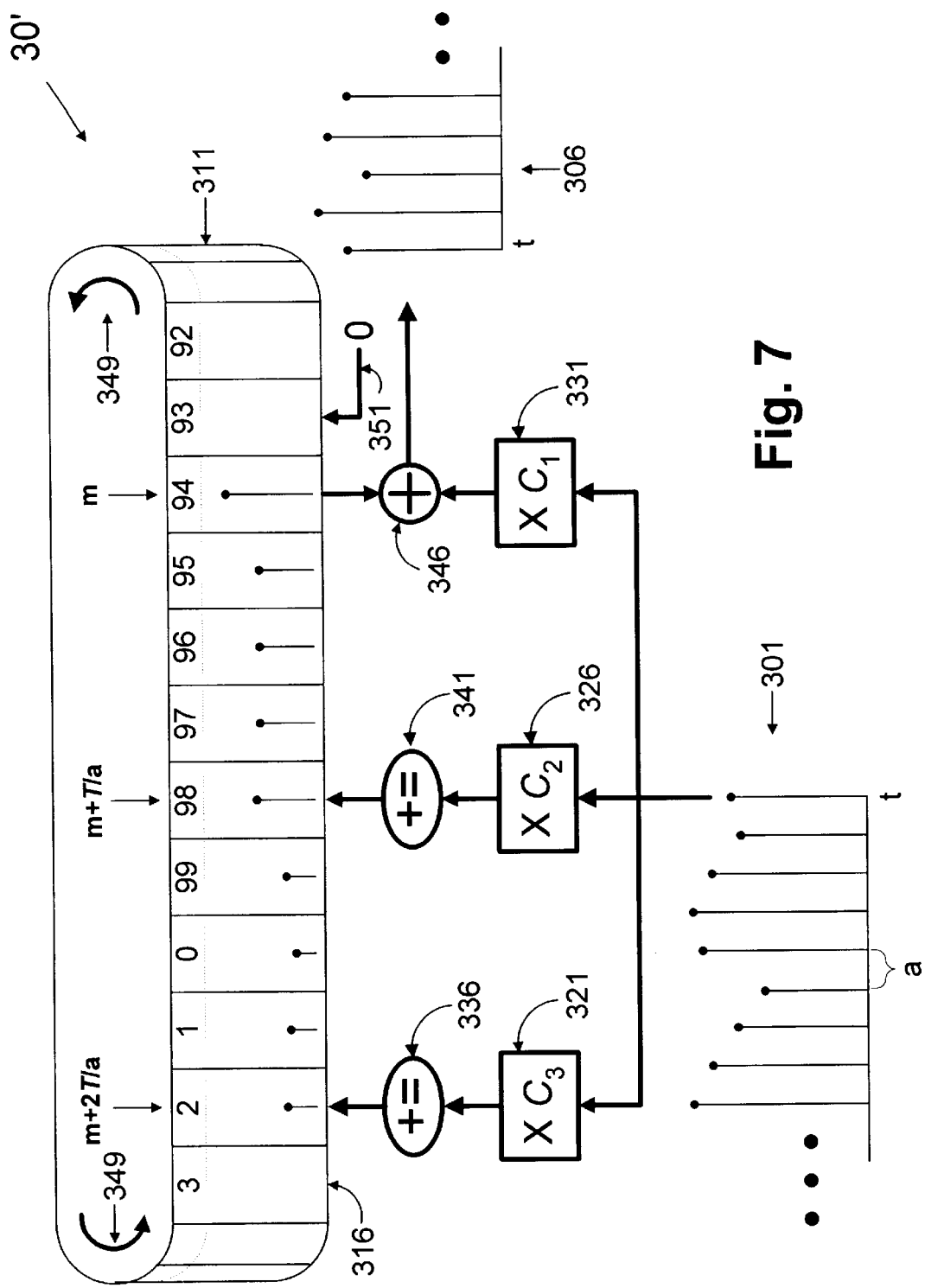
FIG. 7 is a graphical depiction of the method employed in the first embodiment to accomplish the filtering operation of FIG. 6.

Turning now to FIG. 7, shown is a graphical depiction of the OAT filter 30' as performed on the error signal in the first embodiment. The OAT filter 30' is performed by a digital filter that executes a convolution of the filter coefficients and the control signal 301. The control signal 301 is in digital form consisting of a string of discrete signal values as shown. Such a discrete signal can be obtained from the digital sampling of an analog signal as known by those skilled in the art. Each discrete signal value is separated by time period a. After the convolution is performed, a similar filtered digital output signal 306 is created. The revolving array 311 is shown with specific memory locations 316 which are numbered from 0 to 99 respectively, although not all of the memory locations of the revolving array 311 are shown.

To understand the operation of the filter, the latest discrete control signal value at time t is multiplied by the three coefficients 321, 326 and 331. The results of the multiplications with coefficients 321 and 326 are added with the values in the selected memory locations by sum-equal operations 336, 341. The sum-equal operation are a particular computer programming instruction which takes a value out of a memory location, sums that value with another chosen value, and then places the result back in that same memory location. After a particular discrete control signal value has been processed in this manner, the revolving array 311 is rotated 349 a single value and the next discrete control signal value is processed.

Note that the particular memory locations to which the results of the multiplication functions 321, 326 and 331 are added are separated by a value equal to the arbitrary time-delay T divided by the time period a. Thus the memory locations at m, m+T/a, and m+2T/a hold values that are ultimately separated in time by the arbitrary time-delay T.

Finally, the output signal 306 is created from the values held in the array that are a summation of the three coefficient multiplication steps 321, 326 and 331. This step occurs when the multiplication with the coefficient $C_1$ 331 takes place. After the multiplication with $C_1$ 331, the result is added with the value stored at m, which in this case is position 94 in the array 311. The result is sent out as the filtered digital output signal 306. The final step involves placing a zero in the memory location after position m so that location is ready to be used again.

Figure 8:
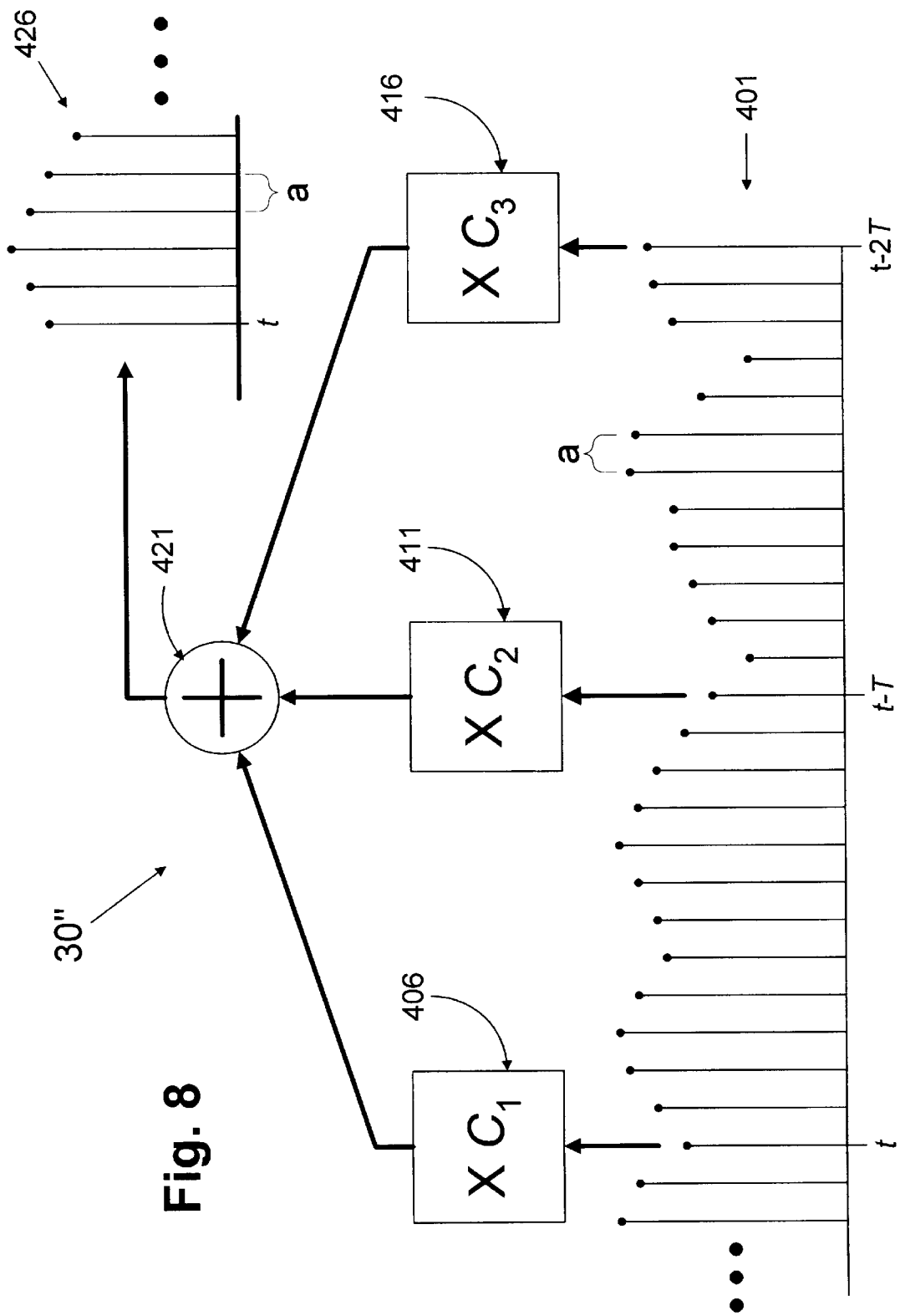
FIG. 8 is a graphical depiction of a second method by which to accomplish the filtering operation of FIG. 6.

Turning to FIG. 8, an alternative OAT filter 30" is shown by which the convolution of FIG. 7 may also be performed. The discrete control signal 401 is placed in an array (not shown) which will hold the number of discrete samples that fall between and including the samples at times t through t−2T as shown. The samples that are held at memory locations which hold the samples for times t, t−T, and t−2T are multiplied by coefficients as shown at 406, 411 and 416. The results of these three multiplication operations are then summed together at summing junction 421, the resulting discrete values of which make up the discrete filtered output 426.

Second Physical Embodiment

Figure 9:
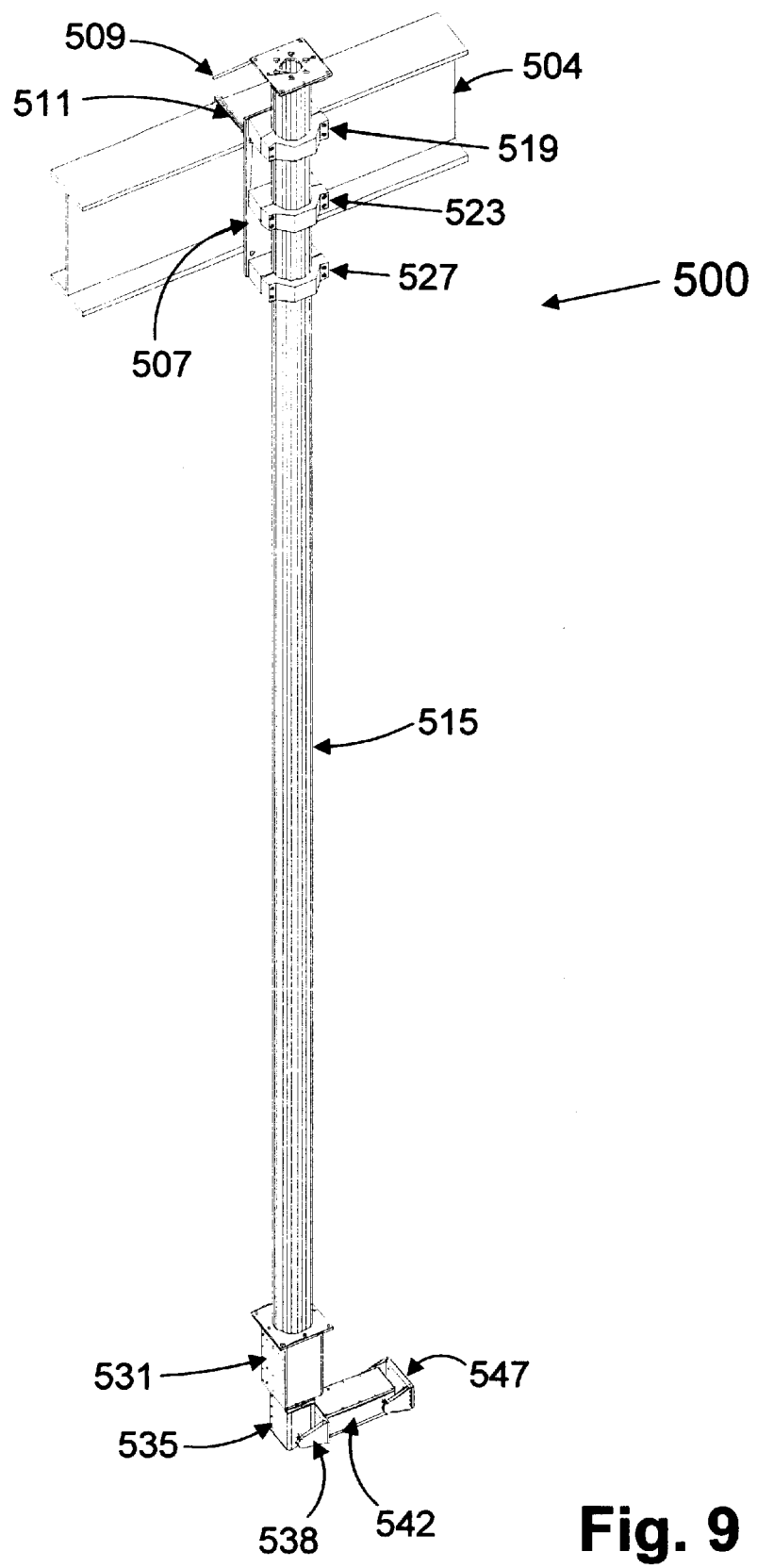
FIG. 9 is a drawing of the physical system of the second embodiment of the invention.

Turning to FIG. 9, shown is the second physical embodiment of the invention which comprises a second mechanical arm 500. The second mechanical arm 500 is connected to beam 504 via first and second clamping plates 507 and 509 which are compressed against the beam 504 by the clamping bolts 511. The pole 515 is held on to the first clamping plate 507 by first, second and third clamps 519, 523, and 527, respectively. Attached to the bottom of pole 515 is a first hydraulic motor 531. The first hydraulic motor 531 spins a rotor on the axis that runs the length of the pole 515. Attached to the rotor of first hydraulic motor 531 is a second hydraulic motor 535. Attached to the rotor of second hydraulic motor 535 is a first bracket 538 which in turn is attached to a third hydraulic motor 542. The third hydraulic motor 542 spins a rotor which is attached to the second bracket 547.

Thus the first, second and third hydraulic motors 531, 535 and 542 of the second mechanical arm 500 will be actuated by a control system similar to that of the first embodiment of the invention and, consequently, it will not be discussed in detail. Since the pole 515 is in excess of twenty feet long, it will oscillate when the hydraulic motors 531, 535 and 542 are actuated. Thus the command signals by which the hydraulic motors 531, 535 and 542 are actuated are filtered according to the present invention and unwanted oscillation of the arm 515 is minimized. The purpose of the illustration of the second physical embodiment is to show the versatility of the present invention as applied to different physical structures.

Other Configurations/Applications

Figure 10:
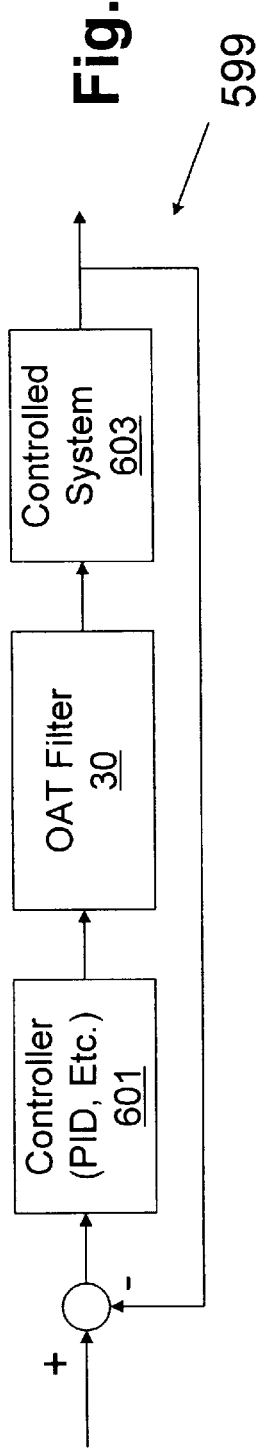
FIG. 10 is a block diagram of a control configuration employed in the first embodiment.
Figure 11:
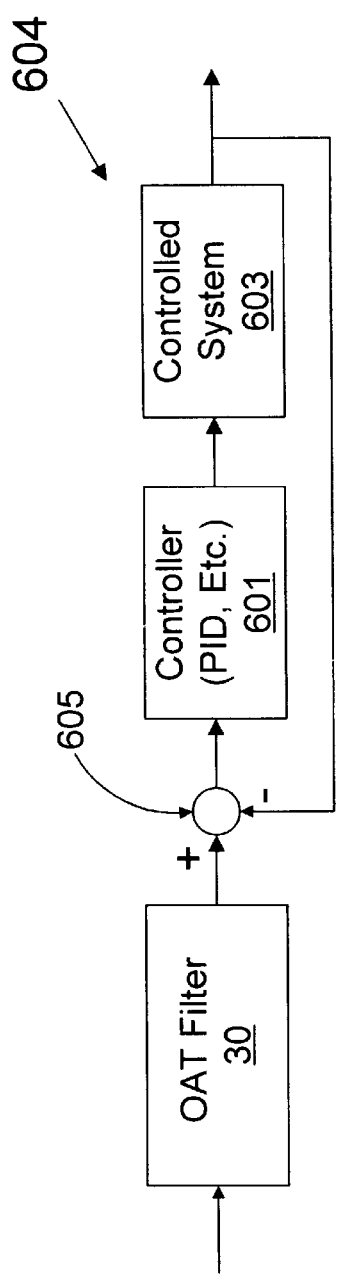
FIG. 11 is a block diagram of a first alternative control configuration in which the OAT filter may be employed.
Figure 12:
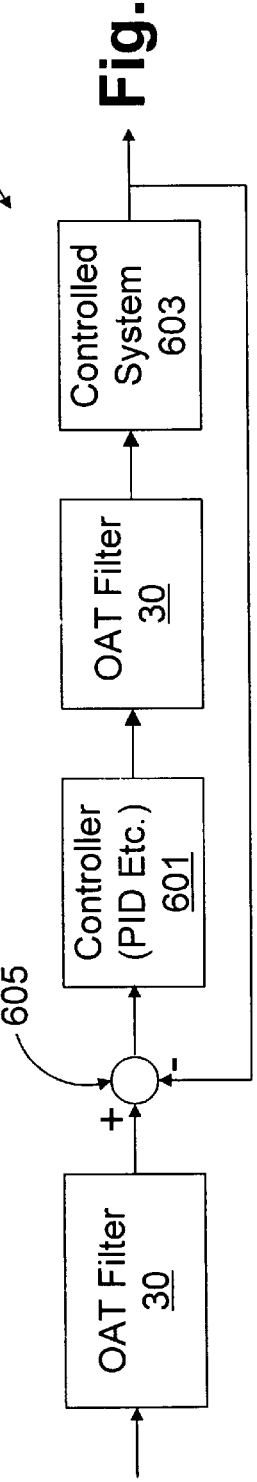
FIG. 12 is a block diagram of a second alternative control configuration in which the OAT filter may be employed.

Turning to FIGS. 10, 11 and 12, shown are various control configurations in which the optimal arbitrary time-delay filter may be implemented. FIG. 10 shows the feedback configuration 599 of the first embodiment in which the OAT filter 30 is placed between the controller 601 and the controlled system 603. In such a case, the OAT filter 30 operates within the feedback loop on the control signal generated by the controller as one skilled in the art will understand. FIG. 11 shows a pre-feedback configuration 604 in which the OAT filter 30 is placed before the summing junction 605 of the control system filtering the input signal before the feedback loop. Finally, FIG.12 shows a pre-feedback/feedback configuration 607 which combines the previous two configurations by placing OAT filters 30 both before the summing junction 605 and between the controller 601 and the controlled system 603.

The different filtering configurations of FIGS. 10, 11 and 12 have their distinct advantages and disadvantages. The configuration 599 of FIG. 10 contains the OAT filter 30 inside a feedback control loop. Stability is of primary concern when the OAT filter 30 is placed inside a feedback control system. While the configuration 599 provides the best tracking performance, it produces the greatest risk of an unstable control system. If the mode of vibration is slow compared with the desired bandwidth of the controller, instability can occur.

The configuration 604 of FIG. 11 avoids the stability issue related of the configuration in FIG. 10 because the algorithm filters the desired command to the feedback control system. However, the configuration 604 decreases the tracking ability because the new desired command can be quite different from the unfiltered command.

The configuration of FIG. 12 realizes the advantages of both configurations 599 and 604. The OAT filters 30 for the modes of vibration that destabilize the control system are moved outside the feedback loop as a pre-filter, and OAT filters 30 for the faster modes of vibration remain inside the feedback loop. This configuration should provide better tracking performance over configuration 604.

It is understood that the first and second physical embodiments are intended as examples of a particular application of the present invention. In particular, the first physical embodiment illustrates an example of the present invention in which hydraulic actuation is controlled in a standard control system using position feedback. There are potentially numerous other applications of the present invention using different types of physical actuation to accomplish a plurality of motions. These types of physical actuation may be classified as active or passive in nature. Active actuators refer to those capable of providing energy to the driven load. Passive actuators only dissipate energy, removing energy from the driven load. The following is a brief discussion of the types of actuators which could be employed in active or passive configurations to which the present invention may be applied to minimize unwanted dynamics. The motion which is created by the types of actuators discussed may be linear movement, rotational movement, pivotal movement, or orbital movement. It is understood, however, that the following discussion is not for the purpose of precluding any types of actuation or specific applications not mentioned, but is merely illustrative of the diversity of physical systems to which the present invention may apply.

For example, the present invention could be used in conjunction with actuation based on fluid flow such as hydraulic, pneumatic, steam pressure or others. The current invention could be applied to aid in the control of steam flow on turbines. Other pneumatic devices which could be controlled include pneumatic cylinders or fans. The present invention applies as well to hydraulic motors and cylinders as in the first and second embodiments.

Potential applications of the present invention may involve the control of actuation which is based on the manipulation of electromagnetic energy such as motors, electro-magnets or other similar technology. For example, the present invention may be applied to control both direct current and alternating current motors, moving coil motors, stepper motors, or induction motors. It applies equally to the control of electrostatic motors which depend upon the repulsion of electrons to produce actuating forces. In situations where fast actuation with only small motion range is required, the present invention may apply to the control of piezoelectric devices.

It would be possible to implement the present invention in the control actuation based on combustion. Combustion based actuation may take the form of internal combustion engines, rockets or jets. By controlling the combustion process, the forces produced by these gases may be controlled to reduce unwanted vibration.

Also, it must be noted that computer software implementing the OAT filter 30 can be stored on any computer readable medium for use by or in connection with a computer-related system or method. In the context of this document, a computer readable medium is an electronic, magnetic, optical or other physical device or means that can contain or store a computer program for use by or in connection with a computer-related system or method.

Thus, it is understood that the present invention may be employed in many different applications. Any variations and modifications may be made to the embodiments of the invention disclosed herein without departing substantially from the spirit and principles of the invention. All such modifications and variations are intended to be included herein within the scope of the present invention, as defined by the following claims.

Finally, any "means" element in the claims hereafter is intended to specify any structure, device, material, composition, or act for performing the function(s) or operation(s) indicated in connection with said means element.

What is claimed is:

1. A digital filter operated on a digital logic circuit to minimize unwanted dynamics in a response of a physical system to a desired motion signal input, comprising:

a filtered motion signal input being equal to a summation of three calculated signals, each calculated signal being a function of said desired motion signal input; and an arbitrary time delay greater than zero, wherein said calculated signals are separated by said arbitrary time delay, wherein said filtered motion signal input minimizes a number of unwanted dynamics in said response of said physical system.

2. The digital filter of claim 1, wherein each of said three calculated signals is a function of a respective coefficient, said coefficients being derived from an optimization of a cost function that defines said unwanted dynamics of said response of said physical system as a function of an instantaneous position error and an instantaneous velocity error.

3. The digital filter of claim 2, wherein:

said filtered motion signal input is defined as y(t);

said desired motion signal input is defined as u(t); and said coefficients are defined by $C_1$, $C_2$ and $C_3$, respectively, and said summation is defined as y(t)= $C_1$u(t)+$C_2$u(t−T)+$C_3$u(t−2T), where u(t−T) and u(t−2T) represent a number of time-delayed values of said desired motion signal input u(t), t is time, and where T is said arbitrary time delay.

4. The digital filter of claim 3, wherein said three coefficients $C_1$, $C_2$ and $C_3$, respectively are further defined for a single mode of vibration, wherein $$C_1 = \frac{1}{M},$$

$$C_2 = \frac{-2\cos\left(\omega_n\sqrt{1-\zeta^2}\ T\right)e^{-\zeta\omega_n T}}{M},$$

$$\text{and } C_3 = \frac{e^{-2\zeta\omega_n T}}{M},$$

where M is a scaling factor, $\omega_n$ is a natural frequency of said physical system, and $\zeta$ is a damping ratio of said physical system.

5. The digital filter of claim 2, wherein said cost function is defined as J(t), where J(t)=½$e^T$(t)$W_1$e(t)+½$\dot{e}^T$(t)$w_2\dot{e}$(t), and wherein said instantaneous position error is equal to e(t), said instantaneous velocity error is equal to $\dot{e}$(t), and $W_1$ and $W_2$ are weighting matrices.

6. A computer readable medium comprising a program for a digital filter to minimize a number of unwanted dynamics in a response of a physical system to a desired motion signal input, the program comprising:

logic for calculating a filtered motion signal input being equal to a summation of three calculated signals, each calculated signal being a function of said desired motion signal input; and said logic including an arbitrary time-delay greater than zero, wherein said calculated signals are separated by said arbitrary time-delay.

7. The computer readable medium of claim 6, wherein each of said three calculated signals is a function of a respective coefficient, said coefficients being derived from an optimization of a cost function that defines said unwanted dynamics of said response of said physical system as a function of an instantaneous position error and an instantaneous velocity error.

8. The computer readable medium of claim 7, wherein said cost function is defined as J(t), where J(t)=½$e^T$(t)$W_1$e(t)+½$\dot{e}^T$(t)$W_2\dot{e}$(t), and wherein said instantaneous position error is equal to e(t), said instantaneous velocity error is equal to $\dot{e}$(t), and $W_1$ and $W_2$ are weighting matrices.

9. The computer readable medium of claim 6, further comprising:

logic defining said filtered motion signal input as y(t);

logic defining said desired motion signal input as u(t);

logic defining said coefficients as $C_1$, $C_2$ and $C_3$, respectively; and logic defining said summation as y(t)=$C_1$u(t)+$C_2$u(t−T)+$C_3$u(t−2T), where u(t−T) and u(t−2T) represent a number of time-delayed values of said desired motion signal input u(t), t is time, and where T is said arbitrary time delay.

10. The computer readable medium of claim 9, wherein said three coefficients $C_1$, $C_2$ and $C_3$, respectively are further defined for a single mode of vibration, where $$C_1 = \frac{1}{M},$$

$$C_2 = \frac{-2\cos\left(\omega_n\sqrt{1-\zeta^2}\ T\right)e^{-\zeta\omega_n T}}{M},$$

$$\text{and } C_3 = \frac{e^{-2\zeta\omega_n T}}{M},$$

where M is a scaling factor, $\omega_n$ is a natural frequency of said physical system and $\zeta$ is a damping ratio of said physical system.

11. A method for generating a filtered motion signal input to a physical system to minimize a number of unwanted dynamics in a response of the physical system comprising the steps of:

establishing a first expression quantifying the unwanted dynamics of said response of said physical system, said first expression defining said unwanted dynamics of said response as a function of an instantaneous position error and an instantaneous velocity error;

minimizing said first expression to produce a filter expression, said filter expression being a function of three coefficients and an arbitrary time delay greater than zero;

filtering a desired motion signal input with said filter expression, producing said filtered motion signal input; and controlling said physical system based on said filtered motion signal input whereby the unwanted dynamics are minimized.

12. The method of claim 11, wherein the step of establishing said first expression further comprises the step of establishing said first expression as $J(t)=\frac{1}{2}e^T(t)W_1e(t)+\frac{1}{2}\dot{e}^T(t)W_2\dot{e}(t)$, wherein $J(t)$ is defined as a cost function associated with the physical system, t is defined as time, e(t) is defined as said instantaneous position error, $\dot{e}(t)$ is defined as said instantaneous velocity error, T is defined as said arbitrary delay, and $W_1$ and $W_2$ are weighting matrices.

13. The method of claim 11, wherein the step of filtering said desired motion signal input with said filter expression further comprises the step of filtering said desired motion signal input with a filter expression that is defined as $$y(t)=C_1u(t)+C_2u(t-T)+C_3u(t-2T),$$

where said filtered motion signal input is defined as y(t), said desired motion signal input is defined as u(t), u(t–T) and u(t–2T) are a number of time-delayed values of said desired motion signal input u(t), said coefficients are defined as $C_1$, $C_2$ and $C_3$, respectively, where t is time, and T is said arbitrary time delay.

14. A method for generating a filtered motion signal input to a physical system from a desired motion signal input to minimize a single mode of vibration in a response of the physical system, comprising the steps of:

determining a natural frequency $\omega_n$ and a damping ratio $\zeta$ of said physical system;

providing a filter expression defined as $y(t)=C_1u(t)+C_2u(t-T)+C_3u(t-2T)$, where said filtered motion signal input is defined as y(t), said desired motion signal input is defined as u(t), u(t–T) and u(t–2T) are a number of time-delayed values of said desired motion signal input u(t), said coefficients are defined as $C_1$, $C_2$ and $C_3$, respectively, t is time, T is said arbitrary time delay greater than 0, and $C_1=1/M$, $$C_2 = \frac{-2\cos\left(\omega_n\sqrt{1-\zeta^2}\,T\right)e^{-\zeta\omega_n T}}{M},$$

and $$C_3 = \frac{e^{-2\zeta\omega_n T}}{M},$$

where M is a scaling factor, generating said filtered motion signal input by filtering the desired motion signal input with said filter expression; and controlling said physical system based on said filtered motion signal input whereby said single mode of vibration is minimized.

15. A method for generating a filtered motion signal input to a physical system from a desired motion signal input to minimize multiple modes of vibration in a response of the physical system, comprising the steps of:

determining a natural frequency $\omega_n$ and a damping ratio $\zeta$ of each of the modes of vibration of said physical system;

generating multiple filter expressions for each mode of vibration, said filter expressions being defined as $y(t)=C_1u(t)+C_2u(t-T)+C_3u(t-2T)$, where said filtered motion signal input is defined as y(t), said desired motion signal input is defined as u(t), u(t–T) and u(t–2T) are a number of time-delayed values of said desired motion signal input u(t), said coefficients are defined as $C_1$, $C_2$ and $C_3$, respectively, t is time, T is said arbitrary time delay, and $C_1=1/M$, $$C_2 = \frac{-2\cos\left(\omega_n\sqrt{1-\zeta^2}\,T\right)e^{-\zeta\omega_n T}}{M},$$

and $$C_3 = \frac{e^{-2\zeta\omega_n T}}{M},$$

where M is a scaling factor;

generating said filtered motion signal input by filtering the desired motion signal input with said multiple filter expressions, wherein the desired motion signal input is processed by each filter expression in succession; and controlling said physical system based on said filtered motion signal input whereby said multiple modes of vibration is minimized.

16. A method for controlling a physical system to minimize unwanted dynamics in a response of the physical system, comprising the steps of:

generating a desired motion signal input;

convolving said desired motion signal input with a filter comprising three coefficients and an arbitrary time delay, thereby generating a filtered motion signal input; and controlling said physical system based on said filtered motion signal input.

* * * * *

UNITED STATES PATENT AND TRADEMARK OFFICE
CERTIFICATE OF CORRECTION

PATENT NO. : 6,078,844  
DATED : June 20, 2000  
INVENTOR(S) : Magee et al.

Page 1 of 2

It is certified that error appears in the above-identified patent and that said Letters Patent is hereby corrected as shown below:

Title page,
Add "Related U.S. Application Data" heading with the following provisional application listed under the heading:
Provisional application No. 60/017745, May 15, 1996.

Column 3,
Lines 31 and 34, after "input," delete "$\tau_m(t)$" and substitute therefor -- $\tilde{\tau}_m(t)$ --.
Line 37, after "vector," delete "$\tau_m(t)$" and substitute therefor -- $\tilde{\tau}_m(t)$ --.
Line 39 and 46, after "inputs," delete "$\tau_m(t)$" and substitute therefor -- $\tilde{\tau}_m(t)$ --.

Replace equation (1.0) with $f_i(t) = \sum_{j=0}^{P_i} f_{ij}\,\delta(t - jT_i)$ with $f_{i0} = 1$, $1 \leq i \leq n$ Line 65, after "inputs," delete "$\tau_m(t)$" and substitute therefor -- $\tilde{\tau}_m(t)$ --.

Line 67, after "inputs," delete "$\tau_{m_i}(t)$" and substitute therefor -- $\tilde{\tau}_{m_i}(t)$ --.

Replace equation (2.0) with -- $\tilde{\tau}_{m_i}(t) = \sum_{j=0}^{P_i} f_{ij}\,\hat{\tau}_{m_i}(t - jT_i)$ --

Replace equation (3.0) with -- $\hat{x}_e(t) = \phi(t,t_0)\hat{x}_e(t_0) + \int_{t_0}^{t} \phi(t,\varepsilon)\,\overline{B}_e\,\hat{\tau}_m(\varepsilon)\,d\varepsilon$ --

Column 4,
Line 27, delete "$\tau_m(t)$" and substitute therefor -- $\tilde{\tau}_m(t)$ --.
Replace equation (4.0) with --

$$\hat{x}_e(t) = \phi(t,t_0)\hat{x}_e(t_0) + \int_{t_0}^{t} \phi(t,\varepsilon)\,\overline{B}_e \begin{bmatrix} \sum_{j=0}^{P_1} f_{1j}\,\hat{\tau}_{m_1}(\varepsilon - jT_1) \\ \vdots \\ \sum_{j=0}^{P_n} f_{nj}\,\hat{\tau}_{m_n}(\varepsilon - jT_n) \end{bmatrix} d\varepsilon$$

--

Line 58, "$\hat{\tau}_m(t)$" and substitute therefor -- $\tilde{\tau}_m(t)$ --.

Replace equation (5.0) with -- $J(t) = \tfrac{1}{2} e^T(t)\,W_1\,e(t) + \tfrac{1}{2}\dot{e}^T(t)\,W_2\,\dot{e}(t)$ --.

UNITED STATES PATENT AND TRADEMARK OFFICE
CERTIFICATE OF CORRECTION

PATENT NO. : 6,078,844
DATED : June 20, 2000
INVENTOR(S) : Magee et al.

It is certified that error appears in the above-identified patent and that said Letters Patent is hereby corrected as shown below:

Replace equation (9.0) with --

$$J(t) = \frac{1}{2}\left\{\left(\hat{x}_{e_d}(t) - \phi(t,t_0)\hat{x}_e(t_0) - \int_{t_0}^{t}\phi(t,\varepsilon)\overline{B}_e \begin{bmatrix} \sum_{j=0}^{P_1} f_{1j}\,\hat{\tau}_{m_1}(\varepsilon - jT_1) \\ \vdots \\ \sum_{j=0}^{P_n} f_{nj}\,\hat{\tau}_{m_n}(\varepsilon - jT_n) \end{bmatrix} d\varepsilon\right)^T \right.$$
$$\left. W\left(\hat{x}_{e_d}(t) - \phi(t,t_0)\hat{x}_e(t_0) - \int_{t_0}^{t}\phi(t,\varepsilon)\overline{B}_e \begin{bmatrix} \sum_{j=0}^{P_1} f_{1j}\,\hat{\tau}_{m_1}(\varepsilon - jT_1) \\ \vdots \\ \sum_{j=0}^{P_n} f_{nj}\,\hat{\tau}_{m_n}(\varepsilon - jT_n) \end{bmatrix} d\varepsilon\right)\right\}$$

--

Column 5,
Line 49, delete "(i.e $t > P_k \cdot T_k$)" and substitute therefor -- (i.e $t > p_k \cdot T_k$) --.

Replace equation (10.0) with -- $m\ddot{v}(t) + b\dot{v}(t) + k\,v(t) = k\,u(t)$ . --

Replace equation (11.0) with -- $\ddot{v}(t) + 2\zeta\omega_n\dot{v}(t) + \omega_n^2\,v(t) = \omega_n^2\,u(t)$ . --

Column 6,
Line 37, after "input ," delete "$\tau_{m_i}(t)$" and substitute therefor -- $\tilde{\tau}_{m_i}(t)$ --.

Column 10,
Line 4, delete "(PHD)" and substitute therefor -- (PID) --.

In the claims, column 13,
Line 64, delete phrase "$J(t) = \frac{1}{2}e^T(t)W_1 e(t) + \frac{1}{2}\dot{e}^T(t)w_2\dot{e}(t)$" and substitute therefor -- $J(t) = \frac{1}{2}e^T(t)W_1\,e(t) + \frac{1}{2}\dot{e}^T(t)W_2\,\dot{e}(t)$ --.

Signed and Sealed this

Twenty-third Day of October, 2001

Attest:

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,078,844
DATED : June 20, 2000
INVENTOR(S) : Magee et al.

It is certified that error appears in the above-identified patent and that said Letters Patent is hereby corrected as shown below:

Title page,
Add "Related U.S. Application Data" heading with the following provisional application listed under the heading:
  Provisional application No. 60/017745, May 15, 1996.

Column 3,
Line 31, after "input," delete " $\tau_m(t)$" and substitute therefor -- $\tilde{\tau}_m(t)$ --.
Line 34, after "input," delete " $\tau_m(t)$" and substitute therefor -- $\tilde{\tau}_m(t)$ --.

Line 37, after "vector," delete " $\tau_{m_i}(t)$ " and substitute therefor -- $\tilde{\tau}_{m_i}(t)$ --.

Line 39, after "inputs," delete " $\tau_m(t)$" and substitute therefor -- $\tilde{\tau}_m(t)$ --.
Line 46, after "input," delete " $\tau_m(t)$" and substitute therefor -- $\tilde{\tau}_m(t)$ --.
Replace equation (1.0) with $$f_i(t) = \sum_{j=0}^{p_i} f_{ij}\, \delta(t - jT_i) \quad \text{with} \quad f_{i0} = 1, \quad 1 \le i \le n$$

Line 65, after "inputs," delete " $\tau_{m_i}(t)$ " and substitute therefor -- $\tilde{\tau}_{m_i}(t)$ --.
Line 67, after "inputs," delete " $\tau_{m_i}(t)$ " and substitute therefor -- $\tilde{\tau}_{m_i}(t)$ --.
Replace equation (2.0) with $$\tilde{\tau}_{m_i}(t) = \sum_{j=0}^{p_i} f_{ij}\, \hat{\tau}_{m_i}(t - jT_i)$$

Replace equation (3.0) with $$\hat{x}_e(t) = \phi(t,t_0)\hat{x}_e(t_0) + \int_{t_0}^{t} \phi(t,\varepsilon)\overline{B}_e\, \hat{\tau}_m(\varepsilon)\, d\varepsilon$$

Column 4,
Line 27, delete " $\tau_m(t)$" and substitute therefor -- $\tilde{\tau}_m(t)$ --.
Replace equation (4.0) with $$\hat{x}_e(t) = \phi(t,t_0)\hat{x}_e(t_0) + \int_{t_0}^{t} \phi(t,\varepsilon)\overline{B}_e \begin{bmatrix} \sum_{j=0}^{p_1} f_{1j}\, \hat{\tau}_{m_1}(\varepsilon - jT_1) \\ \vdots \\ \sum_{j=0}^{p_n} f_{nj}\, \hat{\tau}_{m_n}(\varepsilon - jT_n) \end{bmatrix} d\varepsilon$$

Line 58, delete " $\hat{\tau}_m(t)$ " and substitute therefor -- $\tilde{\tau}_m(t)$ --.
Replace equation (5.0) with $J(t) = \tfrac{1}{2} e^T(t) W_1\, e(t) + \tfrac{1}{2} \dot{e}^T(t) W_2\, \dot{e}(t)$.

UNITED STATES PATENT AND TRADEMARK OFFICE
CERTIFICATE OF CORRECTION

PATENT NO. : 6,078,844
DATED : June 20, 2000
INVENTOR(S) : Magee et al.

It is certified that error appears in the above-identified patent and that said Letters Patent is hereby corrected as shown below:

Replace equation (9.0) with
$$J(t) = \frac{1}{2}\left(\hat{x}_{e_r}(t) - \phi(t,t_0)\hat{x}_e(t_0) - \int_{t_0}^{t}\phi(t,\varepsilon)\overline{B}_r \begin{bmatrix} \sum_{j=0}^{p_1} f_{1,j}\hat{\tau}_{m_1}(\varepsilon - jT_1) \\ \vdots \\ \sum_{j=0}^{p_k} f_{N,j}\hat{\tau}_{m_s}(\varepsilon - jT_N) \end{bmatrix} d\varepsilon \right)^T$$
$$W\left(\hat{x}_{e_r}(t) - \phi(t,t_0)\hat{x}_e(t_0) - \int_{t_0}^{t}\phi(t,\varepsilon)\overline{B}_r \begin{bmatrix} \sum_{j=0}^{p_1} f_{1,j}\hat{\tau}_{m_1}(\varepsilon - jT_1) \\ \vdots \\ \sum_{j=0}^{p_k} f_{N,j}\hat{\tau}_{m_s}(\varepsilon - jT_N) \end{bmatrix} d\varepsilon \right)$$

Column 5,
Line 49 delete "(i.e. t > $P_k \cdot T_k$)" and substitute therefor -- (i.e. t > $p_k \cdot T_k$) --.
Replace equation (10.0) with $m\ddot{v}(t) + b\dot{v}(t) + kv(t) = ku(t)$ .
Replace equation (11.0) with $\ddot{v}(t) + 2\zeta\omega_n \dot{v}(t) + \omega_n^2 v(t) = \omega_n^2 u(t)$ .

Column 6,
Line 37, after "input," delete "$\tau_m(t)$" and substitute therefor -- $\tilde{\tau}_m(t)$ --.

Column 10,
Line 4, delete "(PHD)" and substitute therefor -- (PID) --.

Column 13,
Line 64, delete phrase " $J(t) = \frac{1}{2}e^T(t)W_1 e(t) + \frac{1}{2}\dot{e}^T(t)w_2 \dot{e}(t)$ "
and substitute therefor -- J(t) = ½$e^T$(t) + ½$\dot{e}^T$(t) $W_2$ $\dot{e}$(t) --.

Signed and Sealed this

Fifth Day of February, 2002

Attest:

JAMES E. ROGAN
Director of the United States Patent and Trademark Office

Attesting Officer